United States Patent [19]

Kura

[11] Patent Number: 5,090,555

[45] Date of Patent: Feb. 25, 1992

[54] CONVEYOR OF CONNECTED CARRIAGES

[75] Inventor: Tetsuzo Kura, Sayama, Japan

[73] Assignee: Tsubakimoto Chain Co., Osaka, Japan

[21] Appl. No.: 514,379

[22] Filed: Apr. 27, 1990

[30] Foreign Application Priority Data

Apr. 28, 1989 [JP] Japan ................... 1-107447

[51] Int. Cl.$^5$ ............................................ B65G 29/00
[52] U.S. Cl. ............................. 198/465.1; 198/465.2; 198/580
[58] Field of Search .............. 198/465.1, 465.2, 580, 198/795, 803.01

[56] References Cited

U.S. PATENT DOCUMENTS

| 2,903,120 | 9/1959 | Thomas | 198/465.2 X |
| 3,418,084 | 12/1968 | Allington | 198/465.2 X |
| 3,622,043 | 11/1971 | Chotard | 198/465.1 X |
| 3,805,942 | 4/1974 | Auernhammer | 198/803.01 X |
| 4,144,818 | 3/1979 | Fletcher | 198/465.1 X |
| 4,515,624 | 5/1985 | Sticht | 198/465.2 X |

FOREIGN PATENT DOCUMENTS

| 0328220 | 8/1989 | European Pat. Off. | 198/465.2 |
| 2016896 | 10/1970 | Fed. Rep. of Germany | 198/580 |
| 2241477 | 3/1975 | France | 198/465.1 |
| 1351749 | 11/1987 | U.S.S.R. | 198/465.2 |

Primary Examiner—Robert P. Olszewski
Assistant Examiner—James R. Bidwell
Attorney, Agent, or Firm—Howson & Howson

[57] ABSTRACT

A conveyor composed of connected carriages comprises a conveying path, a plurality of carriages connected together at the front and rear ends of each carriage, and a recprocating driver movable through a predetermined distance, the driver being engageable with at least one of said carriages. A disconnecting device and traverser are provided for disconnecting carriages as they arrive at the end of the conveying path and for transferring them to a return path. A connecting device and traverser are also provided adjacent to the beginning of the conveyor path. The traversers include elevators so that the return path can be located at a level lower than that of the conveying path.

13 Claims, 11 Drawing Sheets

000
CONVEYOR OF CONNECTED CARRIAGES

FIELD OF INVENTION

This invention relates to a conveyor of connected carriages for conveying heavy articles with high degree of positioning accuracy. Particularly, the present invention relates to a conveyor of connected carriages for use in iron works for advancing metal coils (as heavy as 30 tons each) with an accurate pitch relative to various automatons, such as, packaging machines, etc.

BACKGROUND OF INVENTION

Conventionally, chain conveyors or the so-called "walking beams" are used for conveying metal coils.

The former is driven by chains. Consequently, its accuracy of positioning is substantially influenced by elongation of the chains. Thus, a separate positioning device is required between the carriages and the automatons.

In case of the latter, metal coils are conveyed while lifting and lowering the metal coils. Therefore, it is liable to cause damage to the metal coils, and is not preferable from the viewpoint of maintaining the quality of the finished products.

Also, both types of conventional equipment require various apparatus under the conveying path of the metal coils. Namely, in case of a chain conveyor, vertically and endlessly circulating chains and their driving devices are needed. And in case of the walking beams, their driving apparatus and hydraulic apparatus for advancing metal coils are required. Thus, the conveying level of the metal coils is inevitably relatively high and the total cost for installation is also high.

One solution for lowering the conveying level of the metal coils is to provide a pit under the floor, but it has a drawback that the cost therefor is also high.

The objects of the present invention are firstly to provide a conveyor of high positioning accuracy; and secondly to provide a conveyor which is capable of conveying articles with a relatively simple structure while causing little damage to the articles; and thirdly to provide a conveyor of a lower conveying level.

SUMMARY OF INVENTION

The present invention firstly provides a conveyor of connected carriages comprising a conveying path, a plurality of carriages connected together by connecting means provided at the front and rear ends of each carriage, and a driving means for reciprocating through a predetermined distance, said driving means being engageable with at least one of said carriages.

The driving means is adapted to selectively engage with at least one of the carriages. That is, when the driving means moves forward, it engages with one of the connected carriages, so that the engaged carriage may be advanced through a predetermined distance. Since all the carriages are connected by means of the connecting means, as one carriage is conveyed, all the remaining carriages are also conveyed through a predetermined distance.

As the driving means completes its forward motion, it disengages from the carriage and is restored to the original position. At the original position, the next carriage is waiting so as to be conveyed similarly. By repeating the forward and backward motions of the driving means, the carriages may be indexed forward each time by a predetermined pitch.

The carriages are thus directly advanced by the driving means, so that the stopping positions of the carriages may be quite accurate. Moreover, since the other carriages are connected to the carriage thus advanced, they may also assume the accurate stopping positions.

The present invention is secondly the conveyor of connected carriages according to the first invention further comprising a returning path arranged parallel with said conveying path, a traverser provided between the end of the conveying path and the starting point of said returning path, a traverser provided between the starting point of the conveying path and the end of the returning path, and a connecting/disconnecting means for disconnecting a carriage from the next carriage at the end of the conveying path and connecting a carriage to the preceding carriage at the starting point of the conveying path.

In the second invention, the carriages are adapted to circulate substantially on the same level. From the end of the conveying path, the carriages must be returned to the starting point of the conveying path. To that end, a carriage which has arrived at the end of the conveying path is transferred to the returning path by means of the traverser; sent backward along the returning path; and at the end of the returning path, the carriage is transferred to the starting point of the conveying path by means of the traverser. Thus, the carriages may be supplied to the conveying path at all times.

Since the conveying and returning paths may be provided substantially on the same level, and only the driving means is required to be provided on the conveying path, the carriages may be conveyed at the level not substantially higher than the floor.

The present invention is thirdly the conveyor of connected carriages according to the second invention wherein said conveying path is provided at substantially the same level as a working table, said returning path is provided under the working table and said traverser comprises a lifting means so as to transfer the carriages from the conveying path to the returning path.

On the working table, only the carriages appear such that the prescribed processings may take place on the articles carried by the carriages. At the forwarding end of the conveying path, the carriages disappear from the surface of the working table and are transferred to the returning path by means of the traverser and further sent backward to the starting point of the conveying path under the working table. The carriages again appear on the working table at the starting point of the conveying path by means of the traverser. Thus, the returning speed of the carriages may be set freely with no danger to the workers. Also, the working efficiency on the working table is not adversely affected by the returning carriages. It also contributes to the effective utilization of the space on the working table.

DESCRIPTION OF PREFERRED EMBODIMENTS

Since the present invention is useful as a conveyor of heavy articles, preferred embodiments will be described with respect to a conveyor for metal coils in an iron works.

Figure 1:
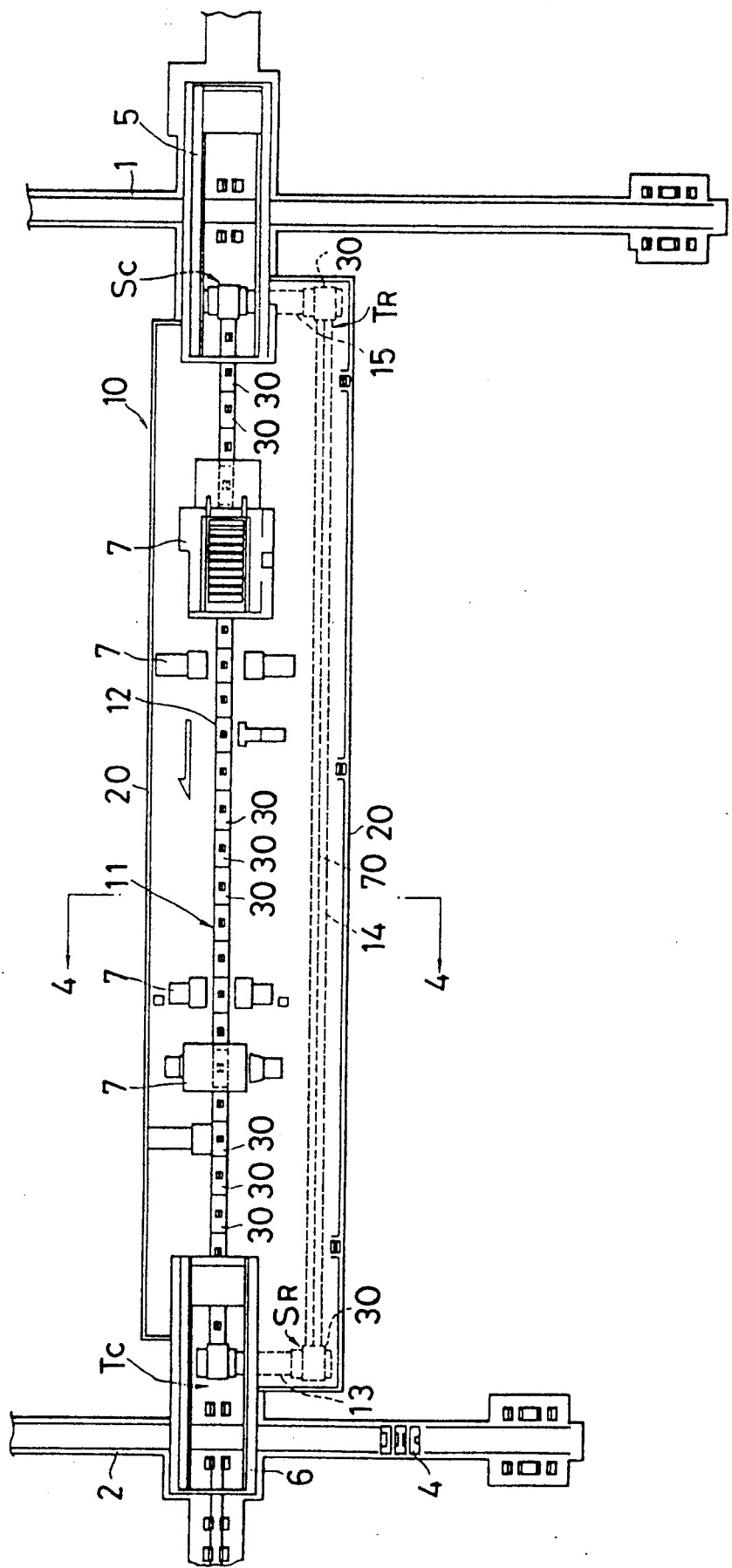
FIG. 1 is a plan view of a packaging line of metal coils in which the present invention is applied.

FIG. 1 is a plan view of the conveyor according to this invention. The reference numeral 10 denotes a packaging line of the metal coils. Various automatons 7 are arranged along the line 10 for packaging the metal coils C. A take-in conveyor 1 and a take-out conveyor 2 are disposed at the opposite ends of the line 10. Lateral-feed carriages 3, 4 carrying the metal coils C are adapted to run on said conveyors 1, 2. The take-in conveyor 1 is arranged perpendicularly relative to the line 10 at one end thereof; and the take-out conveyor 2 is arranged perpendicularly relative to the line 10 at the other end thereof.

Between the take-in conveyor 1 and the packaging line 10, there is provided a coil transfer device 5. A similar coil transfer device 6 is provided between the packaging line 10 and the take-out conveyor 2.

Figure 2:
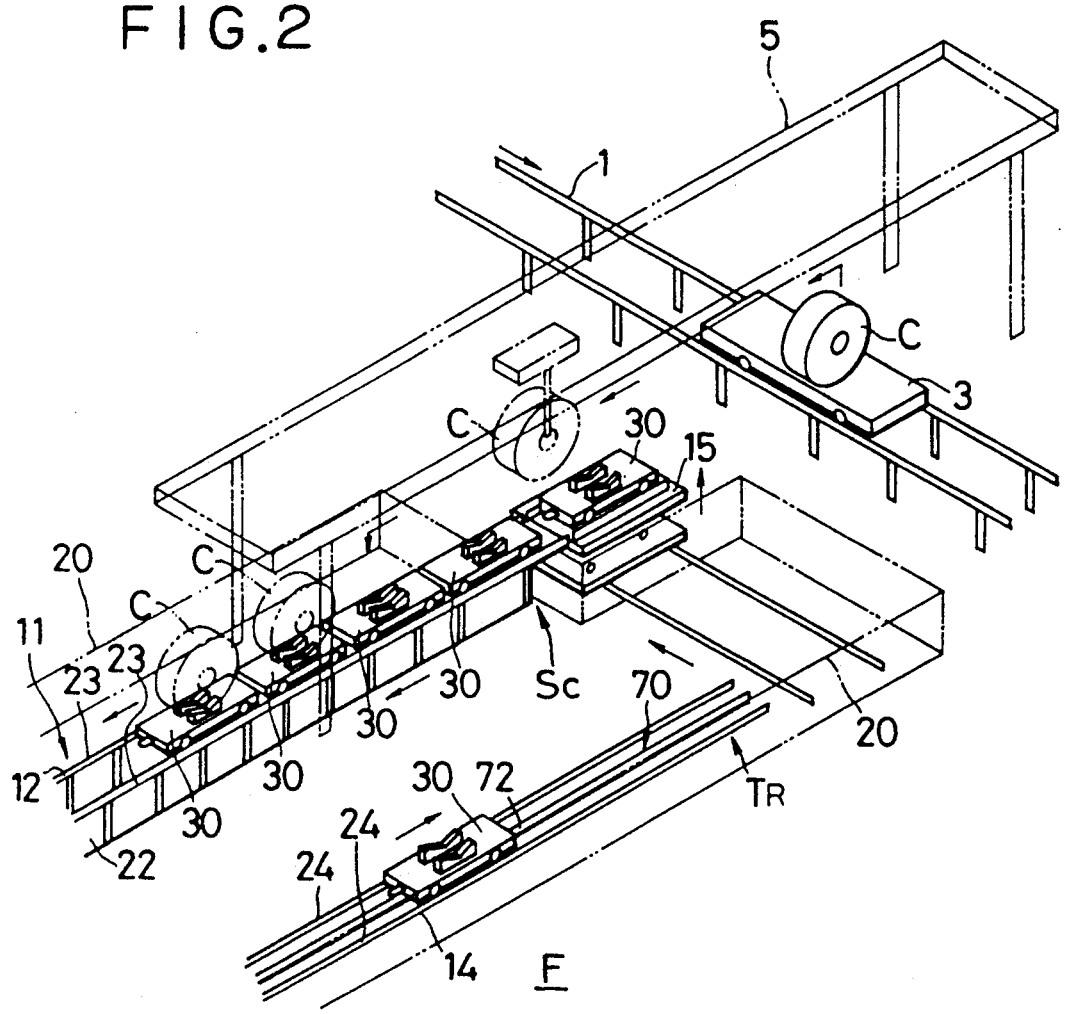
FIG. 2 is an enlarged perspective view at the take-in position of the metal coils.
Figure 3:
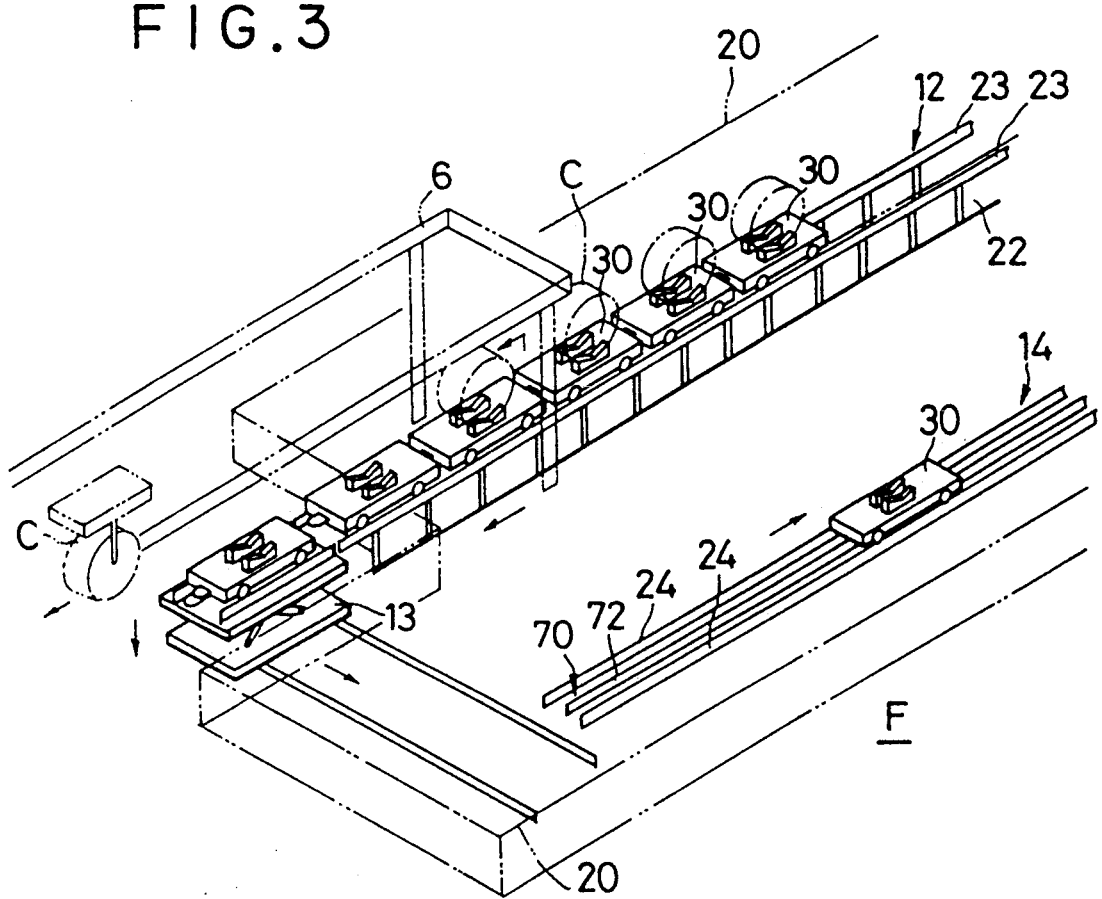
FIG. 3 is an enlarged perspective view at the take-out position of the metal coils.

FIGS. 2 and 3 illustrate respectively said transfer devices 5 and 6 as well as the various equipment associated therewith.

The coils C carried by the lateral-feed carriages 3 movable along the take-in conveyor 1 are adapted to be fed into the packaging line 10 by means of the transfer device 5. The coils C after processing by the automatons 7 on the line 10 are adapted to be discharged onto the lateral-feed carriages 4 movable along the take-out conveyor 2 by means of another transfer device 6. Thereafter, the coils are fed to the next processing station.

Other processing lines, similar to the packaging line 10, may be provided between the take-in conveyor 1 and the take-out conveyor 2. The coils C carried by the lateral-feed carriages 3 on the take-in conveyor 1 are adapted to be fed into the prescribed lines (not shown) so as to be processed appropriately.

The conveyor 11 associated with the packaging line 10 is the conveyor according to the present invention. The whole path of the conveyor 11 is an endless path comprising a conveying path 12, a traverser 13, a returning path 14 and another traverser 15. The carriages 30 are adapted to circulate on said endless path. On the conveying path 12, the carriages 30 are indexed through a predetermined distance or a "pitch" which is equal to the length of one carriage 30 by means of a driving device 60 (FIG. 11) as described later.

The carriages 30 may be connected or disconnected freely relative to each other. On the conveying path 12, the connected carriages 30 are conveyed as a whole from the starting point $S_C$ to the end $T_C$. At the end $T_C$, the foremost carriage is disconnected from the rest of the carriages 30 and is transferred to the traverser 13.

Thereafter, the disconnected carriage 30 is transferred to the starting point $S_R$ of the returning path 14 by means of the traverser 13. The carriage 30 fed to the end $T_R$ of the returning path 14 is transferred to the traverser 15. Then, the carriage 30 is moved to the starting point $S_C$ of the conveying path 12 by means of the traverser 15. At the starting point $S_C$, the carriage 30 is connected to the preceding carriage and once again conveyed along the conveying path 12. Thus, the carriages 30 are adapted to circulate endlessly.

The whole length of the connected carriages 30 on the conveying path 12 is slightly less than the length of the conveying path 12 itself. Therefore, at the starting point $S_C$ of the conveying path 12, a carriage 30 is pushed forward so as to be connected to the preceding carriage 30; and at the end $T_C$ of the conveying path 12, a carriage 30 is disconnected from the next carriage 30 so as to be pulled into the traverser 13. As a result, the carriages 30 may be operated independently on the conveying path 12, on the traversers 13 and 15, and on the returning path 14.

Hereafter, the conveyor 11 according to the present invention will be described sequentially with respect to: (1) the conveying and returning paths 12 and 14; (2) the carriages 30 and the connecting devices 40, 50; (3) the driving devices 60, 70; and (4) the traversers 13, 15 and the connecting/disconnecting devices 90, 100.

CONVEYING AND RETURNING PATHS

Figure 4:
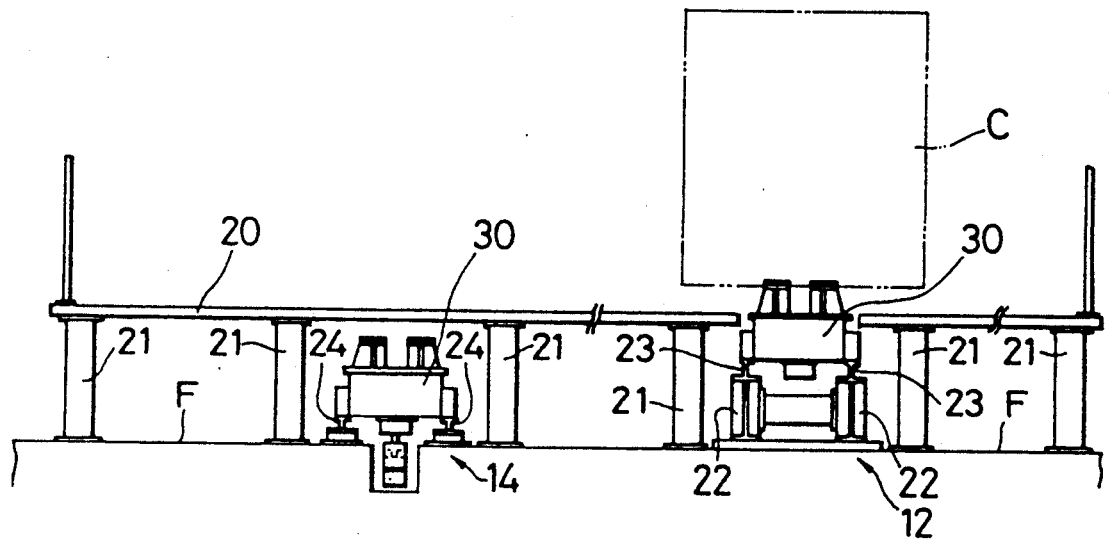
FIG. 4 is a section at line 4—4 of FIG. 1.
Figure 5:
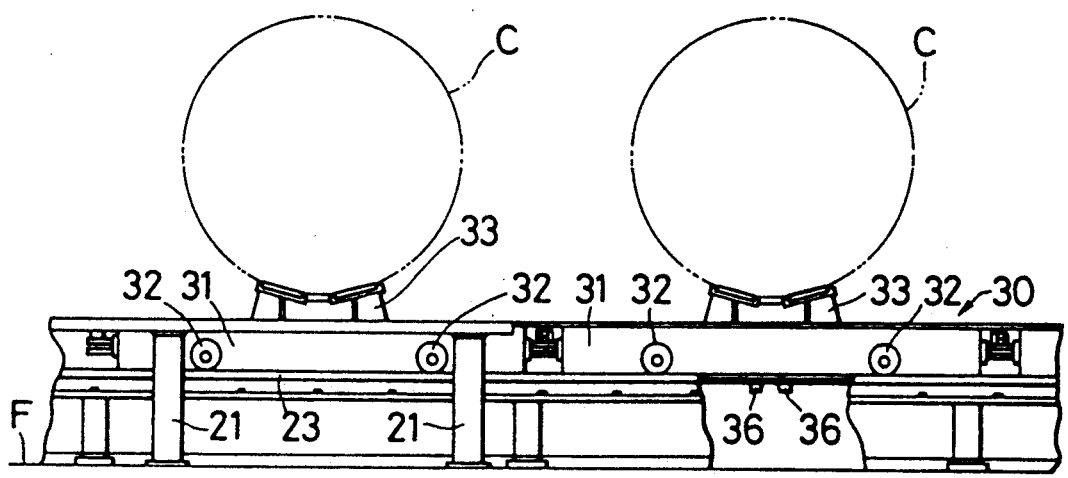
FIG. 5 is a side view of the conveying path.

As shown in FIGS. 4 and 5, the working table 20 of the packaging line 10 is provided higher than the floor F. The table 20 is supported by a plurality of posts 21. The conveying path 12 is provided between the two working tables 20, 20 and the returning path 14 is disposed beneath the working table 20.

The returning path 14 is composed of a pair of rails 24, 24 arranged on the floor F. The carriages 30 are returned on these rails 24, 24. Consequently, the level of the working table 20 may be as low as the sum of the heights of the rails 24, 24 and the carriages 30.

The conveying path 12 is composed of a pair of the foundations 22, 22 and a pair of rails 23, 23 disposed thereon. The height of the foundations 22 is determined such that the upper surface of the carriages 30 is slightly higher than the upper surface of the working table 20. Thus, the level of the working table 20 may be substantially low not requiring a high degree of strength, thereby saving an installation cost. In addition, what move on the working table 20 are only the carriages 30, which ensures safety to the workers and enables an effective utilization of the upper surface of the working table 20.

It is to be noted that the conveying path 12 may be provided on the same horizontal plane as the returning path 14. In that case, those two paths will be provided so as to divide three working tables such that only the rails form the conveying and returning paths. In that case, since the returning path will not be provided beneath the working table, the level of the working table could be made even lower requiring an even lesser degree of strength.

CARRIAGES AND CONNECTING DEVICES

Figure 6:
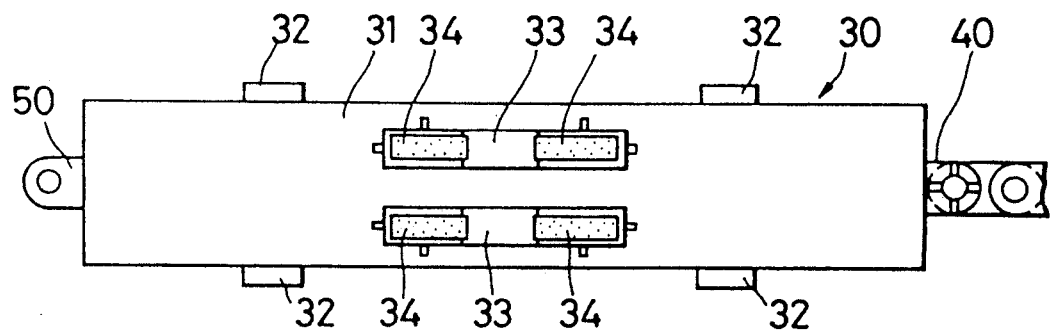
FIG. 6 is a plan view of a carriage.

As shown in FIGS. 4 to 6, a carriage 30 comprises a rectangular frame 31, flanged wheels 32 attached in pairs to the frame 31, supports 33 on the frame 31 for carrying a metal coil C, a projection 35 formed on the lower surface of the frame 31 and connecting devices 40 and 50 provided at the front and rear ends, respectively.

The supports 33 converge toward the center so as to stably support a metal coil C. On the upper surface of a support 33, a rubber sheet 34 is bonded so as not to cause damage to the coils C. A projection 35 is C-shaped so as to open downwardly. (see FIG. 14) The driving devices 60, 70 as explained later are adapted to engage with the projection 35 to drive a carriage 30. The edges of the opening 36 are chamferred.

FIGS. 7 to 10 illustrate the connecting devices 40, 50. At the front end of the carriage 30, a female connecting device 40 is provided; and at the rear end of the carriage 30, a male connecting device 50 is provided. Needless to say, front and rear relationship may be reversed.

The female connecting device 40 includes a pair of vertically spaced tabs 41, 42, a tubular extension 43 extending upwardly from the upper tab 41, and a vertical pin 46 insertable into the tubular extension 43. A bore is formed in the respective tabs 41, 42 so as to align the internal bore of the tubular extension 43. The vertical pin 46 has a horizontally extending pin 47. The tubular extension 43 has a pair of slits 44, 44 which are adapted to accommodate said pin 47. The slots 45, 45 on the upper end of the extension 43 are for receiving said pin 47 so as to keep it disengaged from the lower tab 42.

On the other hand, the male connecting device 50 includes a pair of vertically spaced tabs 51, 52, a vertical pin 56 extending through the respective bores formed in said tabs and a connecting member 53 supported by said pin 56 between said tabs 51, 52. The connecting member 53 may have a slight play between the tabs 51, 52. A pair of stoppers 54, 54 function to prevent the connecting member 53 from horizontally revolving about the pin 56. The connecting member 53 is formed with a bore so as to receive a vertical pin 46 of the female connecting device 40.

Figure 7:
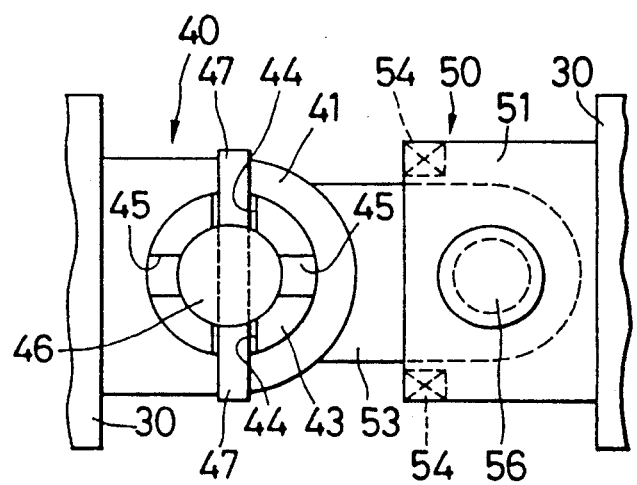
FIG. 7 is a plan view of a connecting device when connected.
Figure 8:
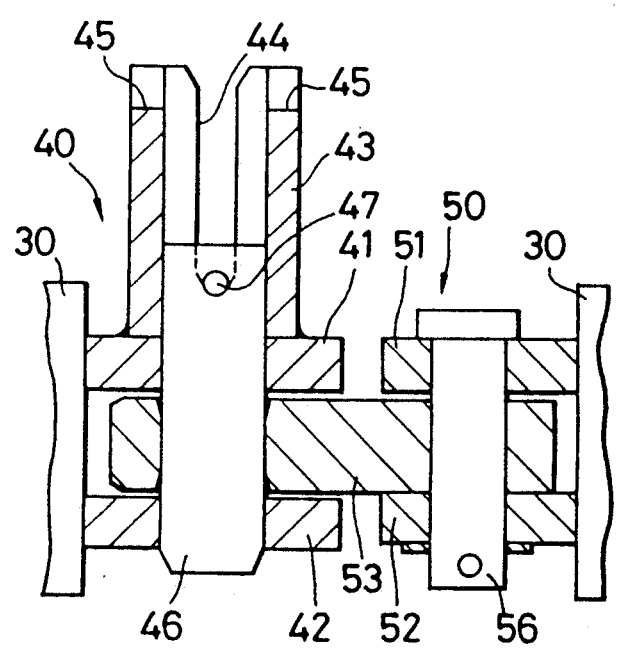
FIG. 8 is a section of a connecting device when connected.

As shown in FIG. 7 and 8, when the connecting member 53 of the male connecting device 50 is held between the tabs 41, 42 of the female connecting device 40 and the pin 46 is inserted into the aligning bores, the adjacent two carriages are connected. The relative angular displacement between the adjacent two carriages may be allowed around the vertical pin 46. Thus, it is possible to include a curve in the conveying path 12.

Figure 9:
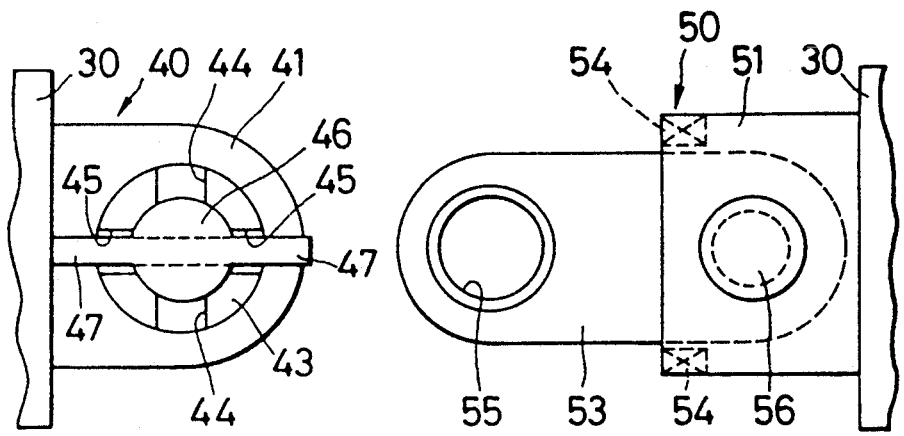
FIG. 9 is a plan view of a connecting device when disconnected.
Figure 10:
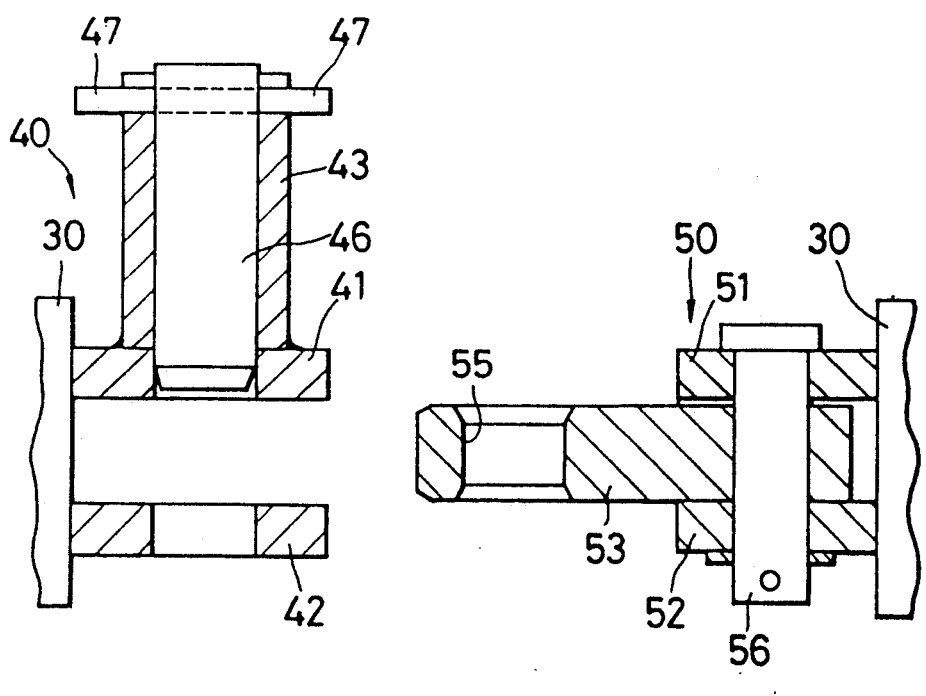
FIG. 10 is a section of a connecting device when disconnected.

On the other hand, FIGS. 9 and 10 show the state in which the vertical pin 46 has been pulled out upwardly, and is resting on the slots 45, 45 by means of the horizontal pin 47. It will be readily understood that in order to disconnect one carriage from another, only the pulling out of the vertical pin 46 needs be effected.

CARRIAGE DRIVING DEVICES

The driving device 60 is for driving the connected carriages 30 as a whole on the conveying path 12 and another driving device 70 is for driving a respective carriage 30 on the returning path 14.

Figure 11:
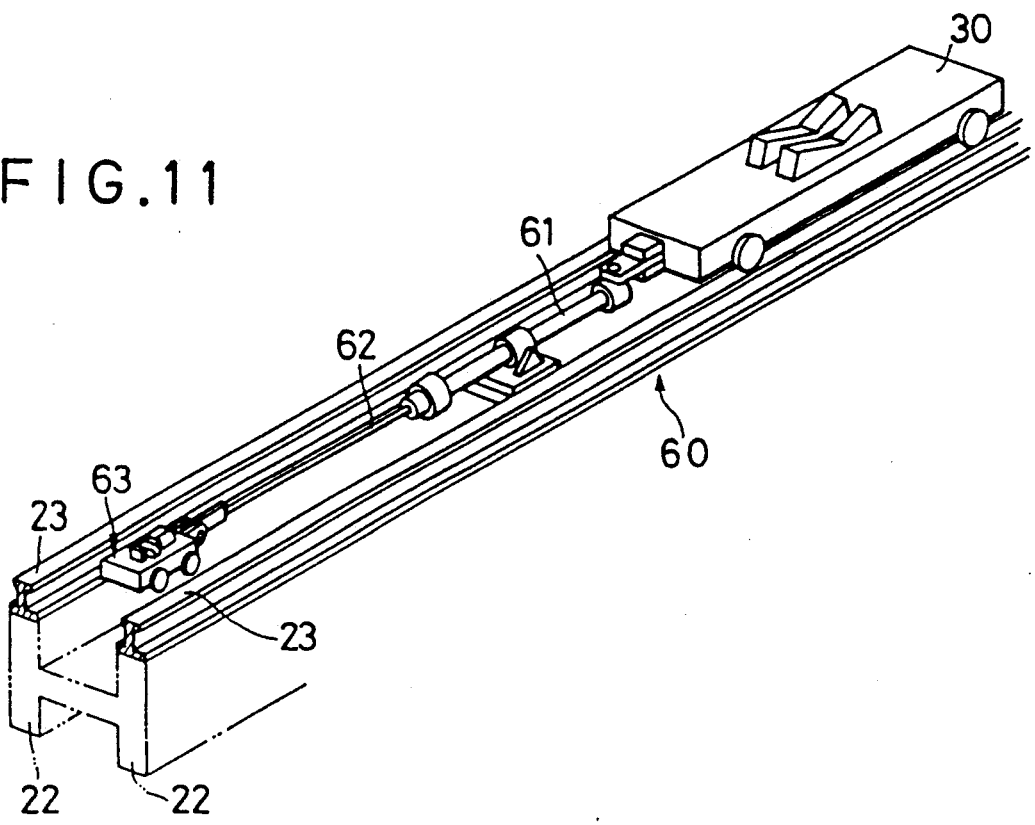
FIG. 11 is a perspective view of a driving device of the conveying path.

FIG. 11 illustrates the driving device 60 on the conveying path 12. The driving device 60 is provided between the rails 23, 23 of the conveying path 12. Preferably, the driving device 60 is provided near the automatons where the positioning accuracy is required. The driving device 60 comprises a hydraulic cylinder 61 mounted to a fixed member, such as a rail, and a tow-pin carriage 63 connected to the operating rod 62 of the cylinder 61. The stroke of the hydraulic cylinder 61 is equal to the length of a carriage 30.

Figure 12:
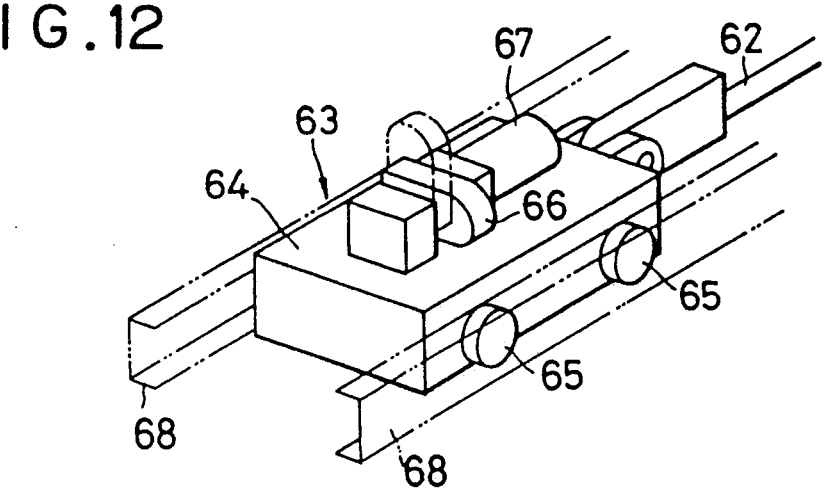
FIG. 12 is a perspective view of a tow-pin carriage in the driving device of FIG. 11.

As shown in FIG. 12, the tow-pin carriage 63 comprises a rectangular frame 64, two pairs of front and rear wheels 65, a swivelable tow-pin 66 and a rotary actuator 67 for the tow-pin 66. The wheels 65 are adapted to be guided by a pair of channel members 68, 68 arranged between the rails 23, 23. The tow-pin 66 is sized to fit into the opening 36 of the projection 35.

The tow-pin carriage 63 may be connected with a carriage 30 when the tow-pin 66 erected as shown in phantom line in FIG. 12 engages with the opening 36 of the projection 35 of the carriage 30. As the operating rod 62 extends, the carriage 30 may be advanced through one pitch. When the tow-pin 66 is restored to the original position (solid line in FIG. 12), the tow-pin carriage 63 disengages from the carriage 30 and the operating rod 62 contracts. At the contracted position of the operating rod 62, the tow-pin 66 is capable of engaging with the projection 35 of the next carriage 30.

As mentioned before, the carriages 30 are connected with each other on the conveying path 12 by means of the connecting devices 40, 50, and consequently, the carriages 30 may be indexed through one pitch accurately by the operation of the hydraulic cylinder 61. The next carriage may be driven similarly. By repeating the same procedure, the connected carriages may be indexed by a predetermined uniform pitch. As a driving device, an electric-powered linear actuator may also be used instead of a hydraulic cylinder.

Figure 13:
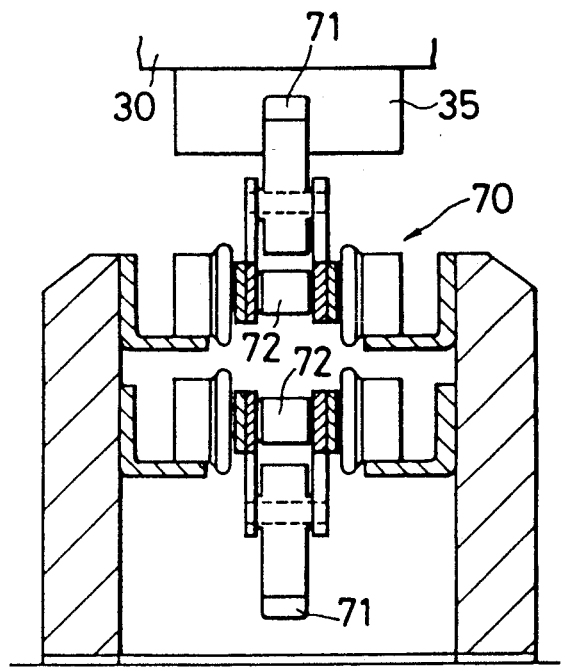
FIG. 13 is a section of a driving device in the returning path.
Figure 14:
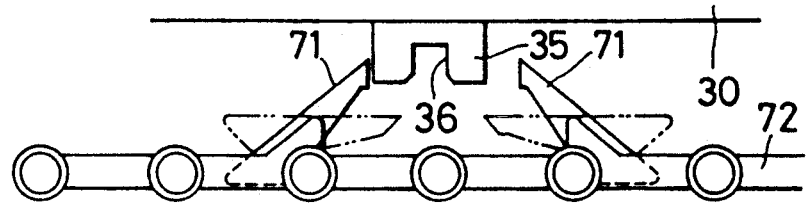
FIG. 14 a side view of the driving device in the returning path.

In the next place, FIGS. 13 and 14 illustrate a driving device for the returning path 14. This driving device 70 comprises a chain conveyor 72 having tilting dogs 71 driven at all times. A carriage 30 fed into the returning path 14 by means of the traverser 13 may be sent backward quickly as the projection 35 is hooked by a tilting dog 71. Since the carriages 30 are returned under the working table 20, there will be no interruption of the processing on the working table 20.

TRAVERSERS, CONNECTING/DISCONNECTING DEVICES

Figure 15:
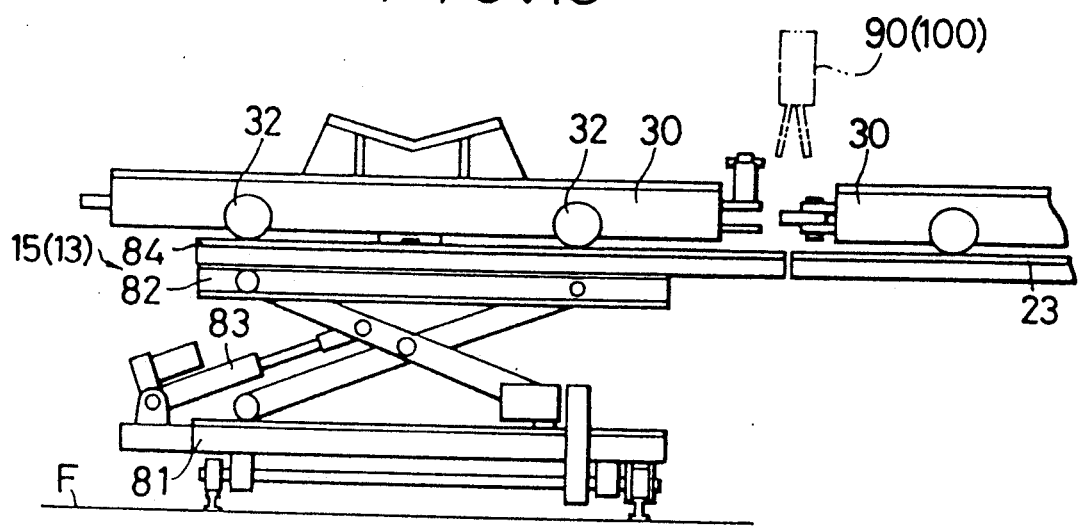
FIG. 15 is a front view of a traverser.

As mentioned before, the traversers 13, 15 are provided between the conveying path 12 and the returning path 14. The traversers 13, 15 include, as shown in FIGS. 2, 3 and 15, a lateral-feed table 81, a frame 82, a lifting mechanism 83, a pair of rails 84, 84 provided on the frame 82 adapted to align with the rails 23, 23 of the conveying path 12 and the rails 24, 24 of the returning path 14.

As mentioned before, there exists a gap between the carriage 30 on the traversers 13, 15 and the adjacent carriage on the conveying path 12. Therefore, a pushing device 85 is provided on the traverser 15 near the starting point $S_C$ of the conveying path 12 and a pulling device 85' is provided on the traverser 13 near the end $T_C$ of the conveying path 12. By virtue of this, carriages 30 may be supplied to the conveying path 12 at the starting point $S_C$ and the carriages 30 may be discharged from the conveying path 12 at the end $T_C$. A carriage 30 on the traversers 13, 15 may be operated independently from the carriages 30 on the conveying path 12.

Figure 16:
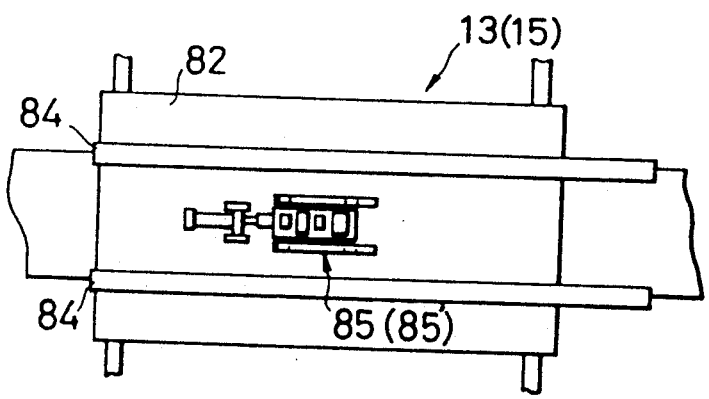
FIG. 16 is a plan view of the traverser.
Figure 17:
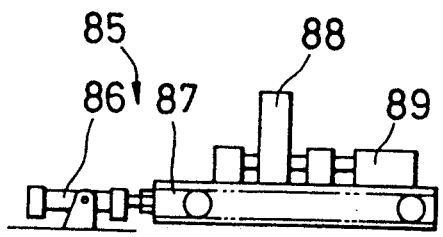
FIG. 17 is a plan view of a pushing (pulling) device.

The pushing and pulling devices are similarly structured and comprise, as shown in FIGS. 16 and 17, a rectangular frame 87 movable to and fro by means of a hydraulic cylinder 86, a cam 88 provided on the frame 87, and a rotary actuator 89 for the cam 88. When the cam 88 engages with the projection 35 on the carriage 30, the frame 87 may be moved by means of the cylinder 86 such that the engaged carriage 30 may be pushed out of the traverser 15 or pulled into the traverser 13.

The connecting device 90 of the carriages 30 is provided at the starting point $S_C$ of the conveying path 12; and the disconnecting device 100 is provided at the end $T_C$ of the conveying path 12, respectively. The connecting device 90 is to connect a carriage 30 pushed out of the traverser 15 by means of the pushing device 85 to the preceding carriage; and the disconnecting device 100 is to disconnect a carriage 30 from the next adjacent carriage before pulling it into the traverser 13 by means of the pulling device 85'. The two devices are similarly structured.

Figure 18:
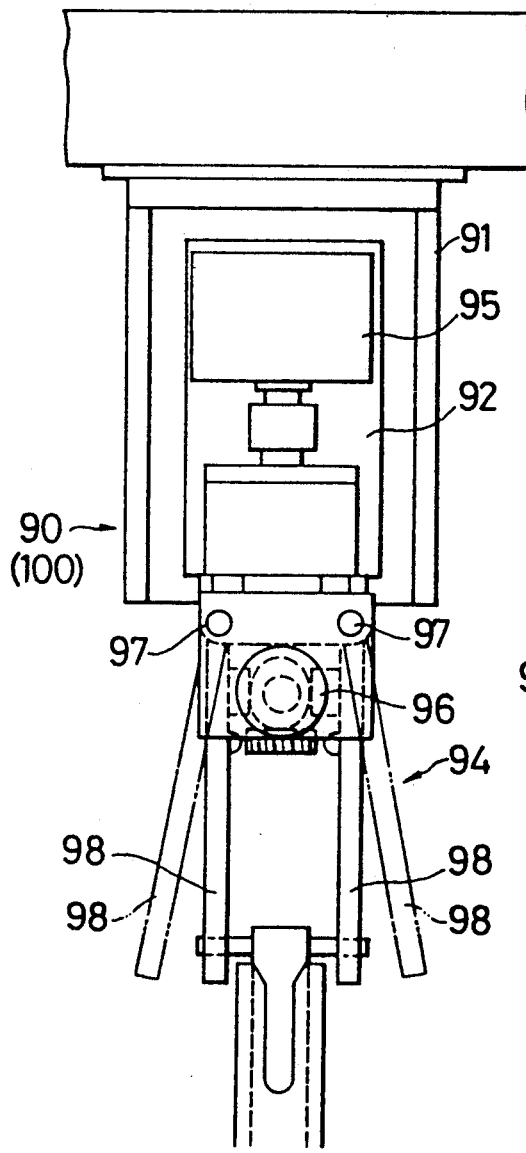
FIG. 18 is a front view of a connecting/disconnecting device.
Figure 19:
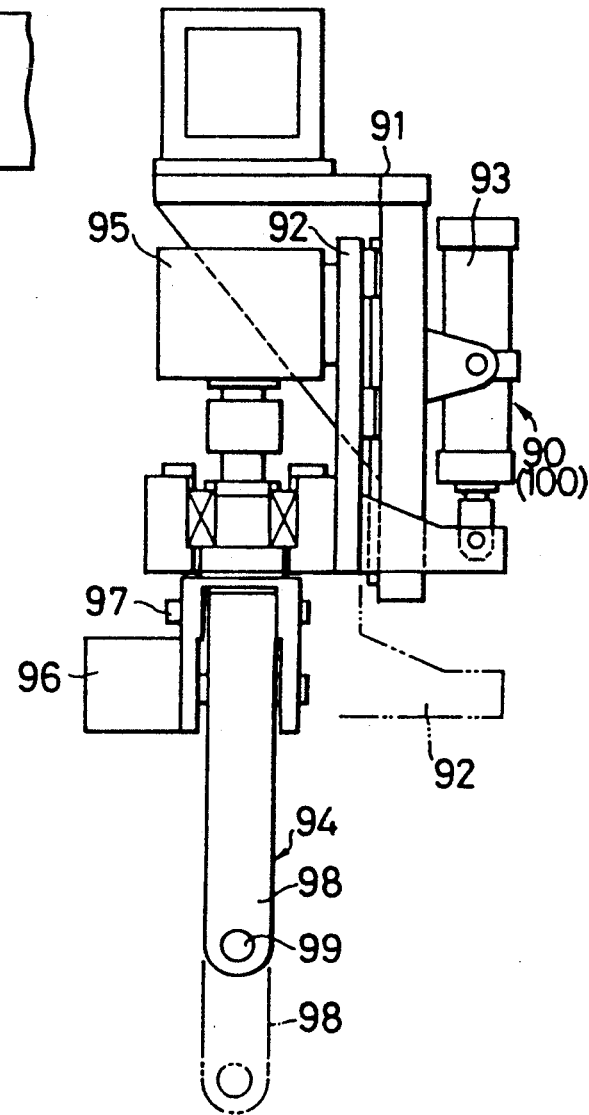
FIG. 19 is a side view of the connecting/disconnecting device.

These devices 90, 100 comprise, as shown in FIGS. 18 and 19, a fixed frame 91, a movable frame 92, a hydraulic cylinder 93 for moving the frame 92, a pair of openable clippers 94 mounted to the frame 92 so as to be rotatable about a vertical axis. Rotation of the clippers 94 may be effected by an actuator 95 and opening/closing of the clippers 94 may be effected by another actuator 96.

The clippers 94 include a pair of arms 98, 98 pivotably supported at the support points 97, 97. At the distal end of the arm 98, a bore 99 is formed to accommodate the horizontal pin 47 of the vertical pin 46 of the female connecting device 40. It will be appreciated that carriages 30 may be connected or disconnected as result of the action of the clippers 94 (namely, up-and-down motion, revolution, and opening/closing motion) which causes the vertical pin 46 to move up and down.

In accordance with the present invention, a packaging line of metal coils in a iron works may be arranged as described above, in which the metal coils are conveyed efficiently without causing damage thereto while endlessly circulating the carriages.

What is claimed is:

1. A conveyor of connected article-supporting carriages comprising rail means disposed along a conveying path, a plurality of article-supporting carriages supported by, and arranged to travel on said rail means, connecting means provided at the front and rear ends of each article-supporting carriage for connecting said article-supporting carriages together, tow pin receiving means on each article-supporting carriage, and driving means, movable through a predetermined distance, for effecting movement of a connected group of said article-supporting carriages in a forward direction along said conveying path, said driving means including a tow pin carriage, means for effecting reciprocating movement of said tow pin carriage along a portion of said conveying path, and means for selectively moving said tow pin into and out of engagement with the tow pin receiving means on said conveying carriages, said tow pin receiving means, when engaged by said tow pin, preventing relative movement of the connected carriages and said tow pin carriage in both the forward and reverse directions along the conveying path, whereby the connected article-supporting carriages in the conveying path on said rail means are movable along said conveying path by the engagement of said tow pin with the tow pin receiving means of one of said connected article-supporting carriages followed by movement of said tow pin carriage, and the connected article-supporting carriages in the conveying path are stopped by stoppage of the movement of said tow pin carriage, followed by disengagement of the tow pin from said tow pin receiving means.

2. The conveyor according to claim 1 wherein said connecting means at one end of each article supporting carriage includes a vertical pin and each article-supporting carriage is swivelable about said vertical pin at said one end thereof.

3. The conveyor according to claim 1 further comprising means providing a returning path arranged parallel with said conveying path, said returning path having a starting point and an end point, a first traverser provided between one end of the conveying path and the starting point of said returning path, a second traverser provided between the other end of the conveying path and the end point of the returning path, and connecting/disconnecting means for disconnecting a carriage from the next carriage at said one end of the conveying path and connecting a carriage to the preceding carriage at said other end of the conveying path.

4. The conveyor according to claim 2 further comprising means providing a returning path arranged parallel with said conveying path, said returning path having a starting point and an end point, a first traverser provided between one end of the conveying path and the starting point of said returning path, a second traverser provided between the other end of the conveying path and the end point of the returning path, and connecting/disconnecting means for disconnecting a carriage from the next carriage at said one end of the conveying path and connecting a carriage to the preceding carriage at said other end of the conveying path.

5. The conveyor according to claim 3 comprising a working table having upper and lower surfaces, and wherein said conveying path is at substantially the same level as said working table and positioned so that articles supported by said article-supporting carriages in said conveying path are located above the work table and accessible from the upper surface of said work table, said returning path is provided under the working table, and at least one of said traverser means comprises lifting means for transferring carriages from one of said conveying and returning paths to the other.

6. The conveyor according to claim 4 comprising a working table having upper and lower surfaces, and wherein said conveying path is at substantially the same level as said working table and positioned so that articles supported by said article-supporting carriages in said conveying path are located above the work table and accessible from the upper surface of said work table, said returning path is provided under the working table, and at least one of said traverser means comprises lifting means for transferring carriages from one of said conveying and returning paths to the other.

7. A conveyor of connected article-supporting carriages comprising means providing a conveying path, a plurality of article-supporting carriages arranged to travel along said conveying path, connecting means provided at the front and rear ends of each article-supporting carriage for connecting said article-supporting carriages together, reciprocating driving means, movable through a predetermined distance, for effecting movement of a connected group of said article-supporting carriages in a forward direction along said conveying path, means providing a returning path arranged parallel with said conveying path, said returning path having a starting point and an end point, a first traverser provided between one end of the conveying path and the starting point of said returning path, a second traverser provided between the other end of the conveying path and the end point of the returning path, connecting/disconnecting means for disconnecting a carriage from the next carriage at said one end of the conveying path and connecting a carriage to the preceding carriage at said other end of the conveying path, and a working table having upper and lower surfaces, and wherein said conveying path is at substantially the same level as said working table and positioned so that articles supported by said article-supporting carriages in said conveying path are located above the work table and accessible from the upper surface of said work table, said returning path is provided under the working table, and at least one of said traverser means comprises lifting means for transferring carriages from one of said conveying and returning paths to the other.

8. The conveyor according to claim 7 wherein said connecting means at one end of each article supporting carriage includes a vertical pin and each article-supporting carriage is swivelable about said vertical pin at said one end thereof.

9. The conveyor according to claim 7 in which said one of said traverser means comprises rail means for receiving an article-supporting carriage, and means, comprising elevator means for raising and lowering said rail means, for aligning said rail means alternatively with said conveying path and said returning path.

10. The conveyor according to claim 9 in which said returning path is laterally offset from said conveying path, and in which said means for aligning said rail means alternatively with said conveying path and said returning path is laterally movable.

11. A conveyor of connected article-supporting carriages comprising means providing a conveying path, a plurality of article-supporting carriages arranged to travel along said conveying path, connecting means provided at the front and rear ends of each article-supporting carriage for connecting said article-supporting carriages together, reciprocating driving means, movable through a predetermined distance, for effecting movement of a connected group of said article-supporting carriages in a forward direction along said conveying path, means providing a returning path arranged parallel with said conveying path, said returning path having a starting point and an end point, a first traverser provided between one end of the conveying path and the starting point of said returning path, a second traverser provided between the other end of the conveying path and the end point of the returning path, and connecting/disconnecting means for disconnecting a carriage from the next carriage at said one end of the conveying path and connecting a carriage to the preceding carriage at said other end of the conveying path, wherein said connecting means at the front and rear ends of each article-supporting carriage comprises vertically movable pin means carried by each carriage at one end thereof for effecting interconnection of the front end of one carriage to the rear end of the carriage in front of said one carriage, said vertically movable pin means having raised and lowered positions, and effecting said interconnection when in said lowered position, while permitting disconnection when in said raised position, and means on each carriage for selectably supporting the pin means thereon in its raised position, and in which said connecting/disconnecting means comprises means adjacent to said one end of the conveying path for effecting movement of pin means on said article-supporting carriages to their raised positions, and means adjacent to said other end of the conveying path for disengaging the pin means from their supporting means to permit movement of the pin means to their lowered positions.

12. A conveyor according to claim 11 including a vertical guide sleeve receiving each of said vertically movable pin means, a cross pin extending horizontally from each vertically movable pin means, first slot means in said guide sleeve for receiving said cross pin and permitting movement of the vertically movable pin means to its lowered position when said cross pin means is located in said first slot means, and second slot means in said guide sleeve for receiving said cross pin, said second slot means being angularly offset from said first slot means whereby said cross pin can be moved from one slot means to the other by lifting said vertically movable pin means, twisting said vertically movable pin means about a vertical axis, and lowering said vertically movable pin means, and in which said connecting/disconnecting means comprises means for lifting, twisting and lowering said vertically movable pin means.

13. A conveyor according to claim 11 including a vertical guide sleeve receiving each of said vertically movable pin means, a cross pin fixed to each vertically movable pin means and extending horizontally therefrom, first slot means in said guide sleeve for receiving said cross pin and permitting movement of the vertically movable pin means to its lowered position when said cross pin means is located in said first slot means, and second slot means in said guide sleeve for receiving said cross pin, said second slot means being angularly offset from said first slot means whereby said cross pin can be moved from one slot means to the other by lifting said vertically movable pin means, twisting said vertically movable pin means about a vertical axis, and lowering said vertically movable pin means, and in which said connecting disconnecting means comprises means for engaging said cross pin and lifting, twisting and lowering the assembly comprising said cross pin and said vertically movable pin means.

* * * * *